US009820162B2

(12) United States Patent
Wang et al.

(10) Patent No.: US 9,820,162 B2
(45) Date of Patent: Nov. 14, 2017

(54) ADAPTIVE CCA AND TX POWER LEVEL ADJUSTMENT FOR DENSE DEPLOYMENT OF WIRELESS NETWORKS

(71) Applicant: MEDIATEK Singapore Pte. Ltd., Singapore (SG)

(72) Inventors: James June-Ming Wang, San Marino, CA (US); Jianhan Liu, San Jose, CA (US); YungPing Hsu, Taipei (TW); Ching-Hwa Yu, Tainan (TW)

(73) Assignee: MEDIATEK SINGAPORE PTE LTD., Singapore (SG)

( * ) Notice: Subject to any disclaimer, the term of this patent is extended or adjusted under 35 U.S.C. 154(b) by 94 days.

(21) Appl. No.: 15/019,849

(22) Filed: Feb. 9, 2016

(65) Prior Publication Data

US 2016/0174079 A1    Jun. 16, 2016

Related U.S. Application Data

(63) Continuation-in-part of application No. PCT/US2015/012556, filed on Jan. 23, 2015.

(60) Provisional application No. 61/931,080, filed on Jan. 24, 2014, provisional application No. 61/932,324, filed on Jan. 28, 2014, provisional application No. 61/937,719, filed on Feb. 10, 2014, provisional application No. 62/114,272, filed on Feb. 10, 2015, (Continued)

(51) Int. Cl.
*H04W 16/14* (2009.01)
*H04W 52/50* (2009.01)

(52) U.S. Cl.
CPC ........... *H04W 16/14* (2013.01); *H04W 52/50* (2013.01)

(58) Field of Classification Search
CPC .............................. H04W 16/14; H04W 52/50
See application file for complete search history.

(56) References Cited

U.S. PATENT DOCUMENTS

2003/0033394 A1   2/2003   Stine ............................ 709/222
2008/0137627 A1   6/2008   Fischer et al. ................ 370/338

FOREIGN PATENT DOCUMENTS

WO    WO2015112780 A1    6/2017

OTHER PUBLICATIONS

International Search Report and Written Opinion of International Search Authority for PCT/US 15/12556 dated Apr. 17, 2015 (6 pages).

(Continued)

*Primary Examiner* — Lester Kincaid
*Assistant Examiner* — William Wang
(74) *Attorney, Agent, or Firm* — Imperium Patent Works; Zheng Jin (57) ABSTRACT

A method of spatial re-use with TPC and adaptive CCA is proposed. A spatial re-use station detects spatial re-use information associated with other peer OBSS stations. The spatial re-use information comprises a TX spectral density (power/Hz) and received signal or interference information of each inter-BSS peer station. The spatial re-use STA determines a TX spectral density based on the detected spatial re-use information. The spatial re-use STA then contends the medium for spatial re-use transmission opportunity (TXOP) with an intra-BSS peer station. Finally, the spatial re-use STA starts spatial re-use frame exchange with the intra-BSS peer station using the determined TX spectral density. By adjusting the TX spectral density, the spatial re-use STA adapts its CCA level to spatially reuse the medium without causing collision and interference to OBSS stations and thus increases network throughput.

27 Claims, 7 Drawing Sheets

Related U.S. Application Data provisional application No. 62/116,703, filed on Feb. 16, 2015.

(56) References Cited

OTHER PUBLICATIONS

EPO, Search Report for the EP patent application 17155030.4 dated Jun. 2, 2017 (7 pages).

ADAPTIVE CCA AND TX POWER LEVEL ADJUSTMENT FOR DENSE DEPLOYMENT OF WIRELESS NETWORKS

CROSS REFERENCE TO RELATED APPLICATIONS

This application is filed under 35 U.S.C. §111(a) and is based on and hereby claims priority under 35 U.S.C. §120 and §365(c) from International Application No. PCT/US15/12556, with an international filing date of Jan. 23, 2015, which in turn claims priority under 35 U.S.C. §119 from U.S. Provisional Application No. 61/931,080 filed on Jan. 24, 2014, U.S. Provisional Application No. 61/932,324 filed on Jan. 28, 2014, and U.S. Provisional Application No. 61/937,719 filed on Feb. 10, 2014. This application is a continuation-in-part of International Application No. PCT/US15/12556, which claims priority from U.S. Provisional Application Nos. 61/931,080, 61/932,324, and 61/937,719. International Application No. PCT/US15/12556 is pending as of the filing date of this application, and the United States is a designated state in International Application No. PCT/US15/12556. This application claims the priority under 35 U.S.C. §119 from U.S. Provisional Application Nos. 61/931,080, 61/932,324, and 61/937,719. This application also claims priority under 35 U.S.C. §119 from U.S. Provisional Application No. 62/114,272 filed on Feb. 10, 2015 and U.S. Provisional Application No. 62/116,703 filed on Feb. 16, 2015. The disclosure of each of the foregoing documents is incorporated herein by reference.

TECHNICAL FIELD

The disclosed embodiments relate generally to wireless network communications, and, more particularly, to adaptive Clear Channel Assessment (CCA) and transmit (TX) power level adjustment for dense deployment in wireless communications systems.

BACKGROUND

IEEE 802.11 is a set of media access control (MAC) and physical layer (PHY) specification for implementing wireless local area network (WLAN) communication, called WiFi, in the unlicensed (2.4, 3.6, 5, and 60 GHz) frequency bands. The standards and amendments provide the basis for wireless network products using the WiFi frequency bands. For example, IEEE 802.11ac is a wireless networking standard in the 802.11 family providing high-throughput WLANs on the 5 GHz band. Significant wider channel bandwidths (20 MHz, 40 MHz, 80 MHz, and 160 MHz) were proposed in the IEEE 802.11ac standard. The High Efficiency WLAN study group (HEW SG) is a study group within IEEE 802.11 working group that will consider the improvement of spectrum efficiency to enhance the system throughput in high-density scenarios of wireless devices. Because of HEW SG, TGax (an IEEE task group) was formed and tasked to work on IEEE 802.11ax standard that will become a successor to IEEE 802.11ac.

In IEEE 802.11ac, a transmitter of a BSS (basis service set) of certain bandwidth is allowed to transmit radio signals onto the shared wireless medium depending on clear channel assessment (CCA) sensing and a deferral or backoff procedure for channel access contention. For a BSS of certain bandwidth, a valid transmission sub-channel shall have bandwidth, allowable in the IEEE 802.11ac, equal to or smaller than the full bandwidth of the BSS and contains the designated primary sub-channel of the BSS. Based on the CCA sensing in the valid transmission bandwidths, the transmitter is allowed to transmit in any of the valid transmission sub-channels as long as the CCA indicates the sub-channel (or full channel) is idle. This dynamic transmission bandwidth scheme allows system bandwidth resource to be efficiently utilized.

An enhanced distributed channel access protocol (EDCA) is used in IEEE 802.11ac as a channel contention procedure for wireless devices to gain access to the shared wireless medium, e.g., to obtain a transmitting opportunity (TXOP) for transmitting radio signals onto the shared wireless medium. The simple CSMA/CA with random back-off contention scheme and low cost ad hoc deployment in unlicensed spectrum have contributed rapid adoption of WiFi systems. Typically, the EDCA TXOP is based solely on activity of the primary channel, while the transmit channel width determination is based on the secondary channel CCA during an interval (PIFS) immediately preceding the start of the TXOP. The basic assumption of EDCA is that a packet collision can occur if a device transmits signal under the channel busy condition when the received signal level is higher than CCA level.

Today, WiFi devices are over-populated. Dense deployment has led to significant issues such as interference, congestion, and low throughput. Raising CCA levels has been shown to increase spatial re-use, which leads to significant increase in the network throughput in some dense deployment scenarios. In dense deployment scenario with multiple small BSS footprints in which APs and non-AP STAs are mostly exchanging frames at the highest MCS (modulation and coding), the baseline CCA level −82 dBm leads to excessive deferral and thus lower overall throughput. For a specific link in the preceding scenario, the highest throughput is achieved approximately at an modified CCA level in which SNR for max MCS≈received signal level/(OBSS interference+noise), where OBSS interference≈CCA level. Note that if CCA level=−82 dBm, the OBSS interference is substantially below the required noise level. By increasing CCA level (OBSS interference) for all BSSs in the scenario, the operating SNR is still above the level required for max MCS. The specific link throughput does not degrade, but CCA deferral is reduced (likelihood of channel access increased) leading to increased network throughput. The network throughput increases until CCA level (OBSS interference) reaches the SNR for max MCS. Above that level, the individual link MCS degradation is to be balanced with increased likelihood of channel access (from increasing the CCA level). In general, raising CCA level can introduce more collision in the networks. It also increases device power consumption due to retries and is unfair to legacy stations since they still use the baseline CCA level.

Similar network throughput increase can be achieved in some dense deployment scenario by lowering the transmit power of all stations (STAs), which also reduces power consumption. However, when there are both legacy and IEEE 802.11ax STAs co-exist in the same environment, only reducing the transmit power of the IEEE 802.11ax STAs can lead to their performance degradation. This is because legacy STAs transmission might not deter for reduced transmit power IEEE 802.11ax STAs (when the received signal falls below the CCA of legacy STAs), but not vice versa. In order to entice IEEE 802.11ax STAs to perform TPC, it is necessary to also allow it to increase its CCA. As a result, an IEEE 802.11ax STA increases its channel access (i.e., higher CCA) but also reduces its transmit power level (lower transmit power) such that it does not cause collision.

It is desirable to have a solution 1) to increase the spatial re-use without causing collision; 2) to maintain fairness between stations in different BSSs; 3) to maintain fairness between HEW stations and legacy stations; and 4) to maintain power efficiency.

SUMMARY

A method of spatial re-use with TPC and adaptive CCA is proposed. A wireless station detects spatial re-use information associated with other inter-BSS stations having an ongoing frame exchange. The spatial re-use information comprises a TX spectral density (power/Hz) and received signal or interference information of each inter-BSS station. The wireless STA determines a TX spectral density based on the detected spatial re-use information. The wireless STA then adapts it CCA level that allows it to contend the medium for spatial re-use transmission opportunity (TXOP) with other wireless station attempting spatial re-use. Finally, the wireless STA starts a spatial re-use frame exchange with the intra-BSS peer station using the determined TX spectral density such that the spatial re-use frame exchange does not interfere with the ongoing frame exchange of the inter-BSS stations. By adjusting the TX spectral density and adapting its CCA level, the wireless STA spatially reuse the medium without causing collision and interference to OBSS stations and thus increases network throughput.

In one embodiment, the received signal or interference information comprises a received signal strength indicator (RSSI), a received interference level, or the adjusted CCA level, optionally scaled by a signal bandwidth. The spatial re-use information further comprises a BSS color of the inter-BSS stations (which identifies the station's BSS), and a remaining TXOP of the ongoing frame exchange such that the spatial re-use TXOP is set to be less than or equal to the remaining TXOP of the ongoing frame exchange.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
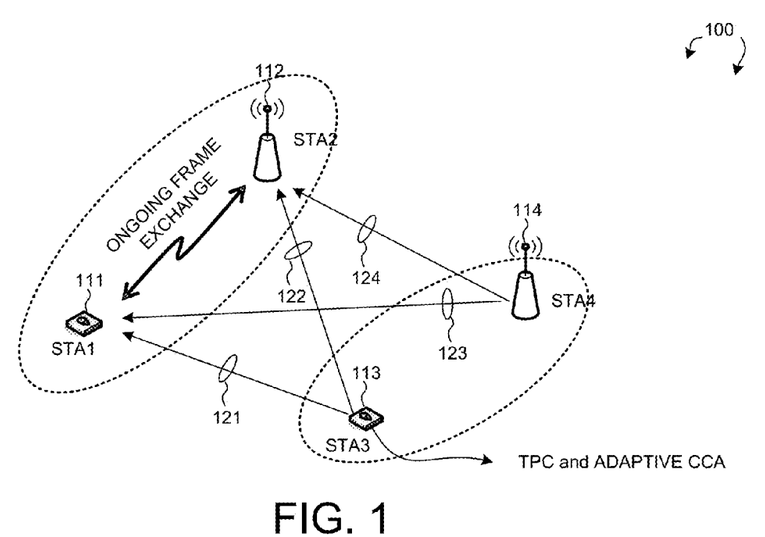
FIG. 1 illustrates a wireless network having overlapping BSS (OBSS) with spatial re-use in accordance with one novel aspect.

FIG. 1 illustrates a wireless network 100 having overlapping basic service set (OBSS) with spatial re-use in accordance with one novel aspect. Wireless network 100 comprises a plurality of wireless stations 111 (STA1), 112 (STA2), 113 (STA3), and 114 (STA4). Each station can be an access point station (AP-STA), or a non-AP-STA. STA1 and STA2 belong to a first BSS1 having STA2 as an access point (AP), and STA3 and STA4 belong to a second BSS2 having STA4 as an access point (AP). BSS1 and BSS2 are overlapping BSS (OBSS) with overlapping coverages. In the example of FIG. 1, STA1 and STA2 have gained the access to the wireless medium and have ongoing frame exchange between them. Meanwhile, STA3 is trying to initiate a frame exchange with STA4.

In IEEE 802.11 wireless networks, an enhanced distributed channel access protocol (EDCA) is used as a channel contention procedure for wireless devices to gain access to the shared wireless medium, e.g., to obtain a transmitting opportunity (TXOP) for transmitting radio signals onto the shared wireless medium. During the first stage of EDCA, the TXOP is obtained based solely on activity of the primary channel. The primary channel is BUSY of one of the predefined conditions is met based on Clear Channel Assessment (CCA) sensitivity levels. During the second stage of EDCA, the transmit channel width is selected based on the secondary channel CCA during an interval (PIFS) immediately preceding the start of TXOP. The secondary channel is BUSY if one of the predefined conditions is met based on CCA levels.

IEEE 802.11ac is a wireless networking standard in the 802.11 family providing high-throughput WLANs on the 5 GHz band. The High Efficiency WLAN study group (HEW SG) is a study group within IEEE 802.11 working group that will consider the improvement of spectrum efficiency to enhance the system throughput in high-density scenarios of wireless devices. Because of HEW SG, TGax (an IEEE task group) was formed and tasked to work on IEEE 802.11ax standard that will become a successor to IEEE 802.11ac.

In general, raising CCA levels has been shown to increase spatial re-use, which leads to significant increase in the network throughput in some dense deployment scenarios. In dense deployment scenario with multiple small BSS footprints in which APs and non-AP STAs are mostly exchanging frames at the highest MCS (modulation and coding), the baseline (primary channel) CCA level −82 dBm leads to excessive deferral and thus lower overall throughput. However, raising CCA level can introduce more collision in the networks. It also increases device power consumption due to retries and is unfair to legacy stations since they still use the baseline CCA level. It has been observed that similar network throughput increase can be achieved in some dense deployment scenarios by lowering the transmit power of all STAs, which also reduces power consumption. On the other hand, when there are both legacy stations and IEEE 802.11ax stations co-exist in one area, only reducing the transmit power of the IEEE 802.11ax STAs can lead to performance degradation of the IEEE 802.11ax STAs.

In one novel aspect, a solution based on transmit power control (TPC) and adaptive CCA level is provided 1) to increase the spatial re-use without causing collision; 2) to maintain fairness between stations in different BSSs; 3) to maintain fairness between HEW stations and legacy stations; and 4) to maintain power efficiency. As illustrate in FIG. 1, if STA3 wants to establish a link with STA4 without interfering with STA1/STA2 with spatial re-use, it requires several pre-conditions: 1) STA3 needs to identify whether the STA1/STA2 link is an inter-BSS link or an intra-BSS link; 2) STA3 should not cause interference to STA1 and STA2, e.g., radio signal 121 does not interfere STA1 and radio signal 122 does not interfere STA2; and 3) STA4 should not cause interference to STA1 and STA2, e.g., radio signal 123 does not interfere STA1 and radio signal 124 does not interfere STA4. In the current baseline EDCA procedure, only STA3 (the initiating STA) performs CCA procedure. STA4 (the responding STA) does not perform CCA. Thus, the pre-condition 3) might not be satisfied. When STA4 transmission results in collision, it is called the hidden node problem. Skipping the pre-condition 3) results in simpler procedure at the expense of higher chance of collision. Additionally, pre-condition 2) might only be partially satisfied, i.e., STA3 might cause interference to one of STA1 or STA2. In a preferred embodiment, TPC and adaptive CCA is applied by STA3 and/or STA4 to satisfy the preconditions for spatial re-use and thereby increasing network throughput.

Figure 2:
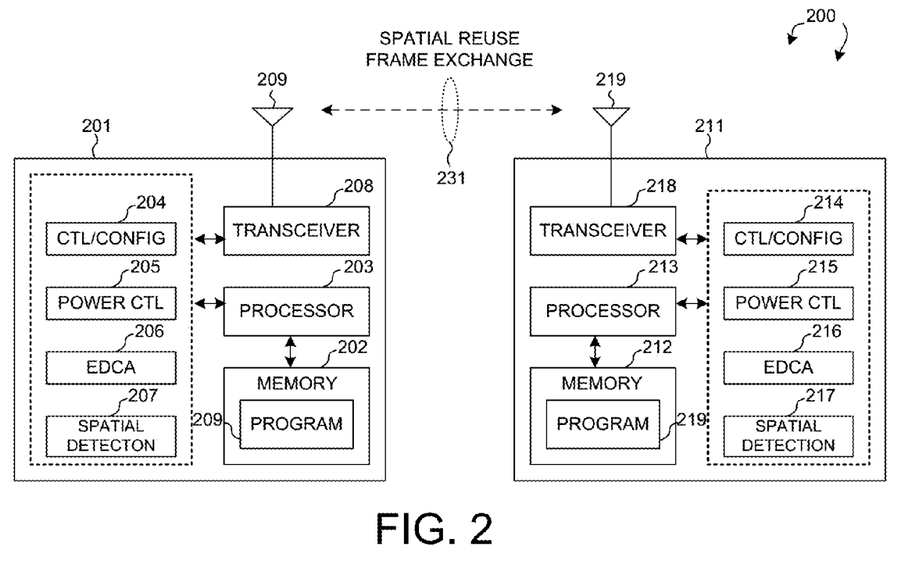
FIG. 2 is a simplified block diagram of as initiating device and a responding device in accordance with one novel aspect.

FIG. 2 is a simplified block diagram of an initiating device 201 and a responding device 211 in a wireless network 200 in accordance with one novel aspect. Initiating device 201 comprises memory 202, a processor 203, a control and configuration module 204, a power controller 205, an EDCA module 206, a spatial re-use detection module 207, and a transceiver 208 coupled to antenna 209. Similarly, responding device 211 comprises memory 212, a processor 213, a control and configuration module 214, a power controller 215, an EDCA module 216, a spatial re-use detection module 217, and a transceiver 218 coupled to antenna 219. In the transmitting direction, the transceiver converts received baseband signals from the processor to RF signals and sends out to the antenna. Similarly, in the receiving direction, the processor processes the received baseband signals from the transceiver and invoke different functional modules to be configured to perform various features supported by the wireless devices.

The different modules are functional modules that can be implemented in software, firmware, hardware, or any combination thereof. The function modules, when executed by processors 203 and 213 (via program instructions 209 and 219 contained in memory 202 and 212), interwork with each other to allow the wireless devices to perform channel access with spatial re-use. For example, the spatial re-use detection module observe the wireless medium to confirm that it is allowed to start a spatial re-use frame exchange 231, the EDCA module contends the wireless medium for spatial re-use with other STAs through a random backoff EDCA procedure, the control and configuration module performs various control and configuration functionalities, and the power control module determines and controls a transmit (TX) power level (or TX spectral power density) such that spatial re-use frame exchange 231 does not cause collision in the network.

Figure 3:
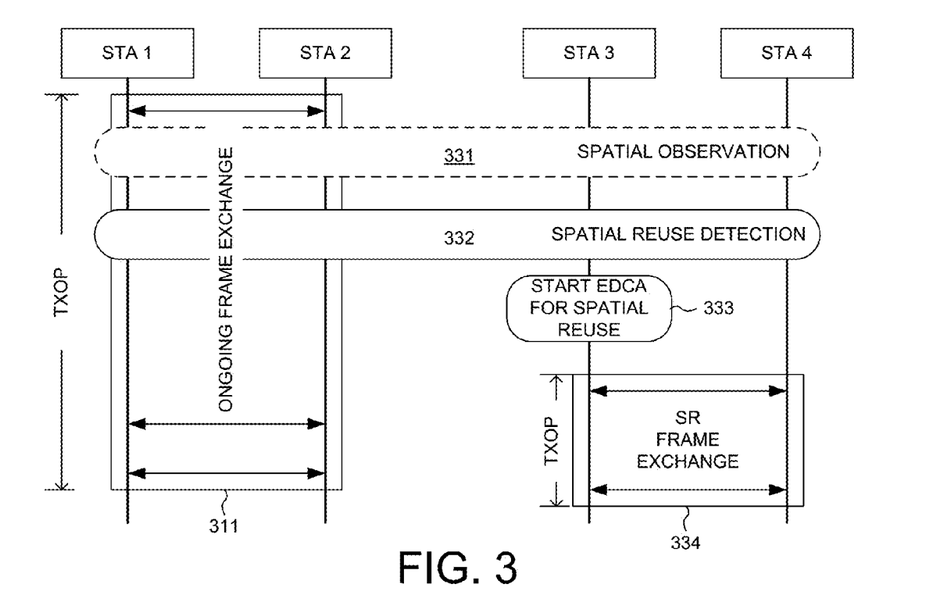
FIG. 3 illustrates a method flow of a wireless device performing spatial re-use frame exchange in a wireless network.

FIG. 3 illustrates a method flow of a wireless device performing spatial re-use frame exchange in a wireless network. The wireless network comprises a plurality of stations STA1, STA2, STA3, and STA4. In step 311, STA1 and STA2 have gained a TXOP to access the wireless medium and have ongoing frame exchange between them. STA3 is trying to initiate a frame exchange with STA4 by exploiting spatial re-use of the wireless medium. In step 331, STA3 performs spatial observation of the wireless medium and update its database for spatial re-use purpose. Note that spatial observation is an optional step and can occur during a long-term or a short-term moving observation window before the actual spatial re-use frame exchange. In step 332, STA3 performs spatial re-use detection and observes the on-going frame exchange in the wireless medium to confirm whether STA3 is allowed to start a spatial re-use frame exchange. In a preferred embodiment, STA3 applies TPC with adaptive CCA level in determining its TX power level. STA3 decides whether its TX power level is sufficient to close the link with STA4 based on its prior experience or observation. If there is not sufficient margin to close the link, STA3 abandons its attempt for spatial re-use based on current spatial detection. If STA3 has sufficient link margin, it then raises its CCA level based on the observed signal (power density) level from STA1 and STA2 such that it can perform EDCA backoff procedure. In step 333, STA3 performs an EDCA backoff procedure to contend the wireless medium with other spatial re-use STAs for spatial re-use frame exchange with STA4. Finally, in step 334, STA3 gains a spatial re-use TXOP and starts frame exchange with STA4. STA4 is engaging in spatial observation when it receives a spatial re-use packet from STA3. In a preferred embodiment, STA4 applies TPC in determining its TX power level when it transmits a response to STA3.

Figure 4:
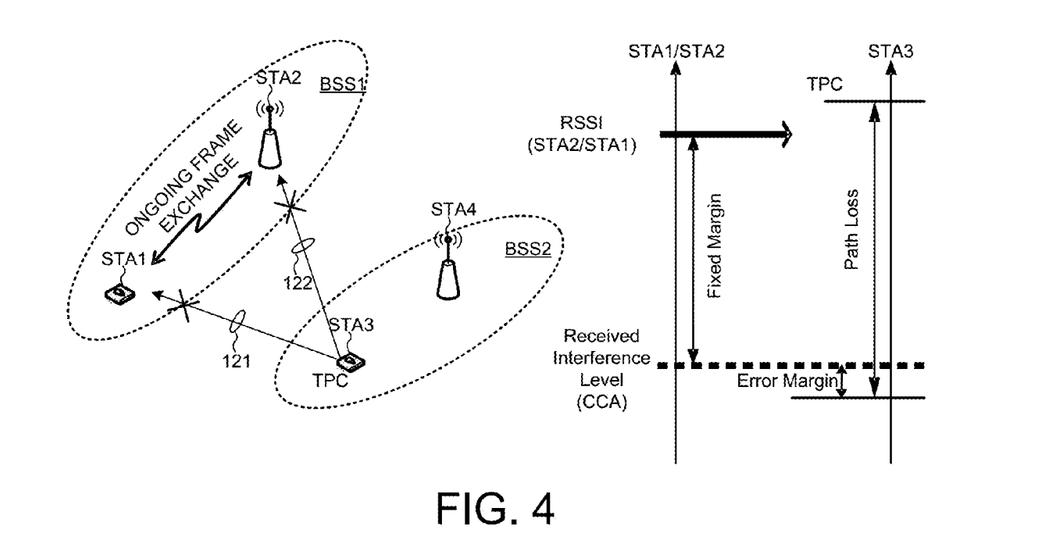
FIG. 4 illustrates a preferred embodiment of transmit power control and adaptive CCA level for spatial re-use with HEW stations.

FIG. 4 illustrates a preferred embodiment of transmit power control (TPC) and adaptive CCA level for spatial re-use with HEW stations. In the embodiment of FIG. 4, STA1 and STA2 have ongoing frame exchange in BSS1, and STA3 applies TPC to ensure that any spatial re-use frame exchange in BSS2 will not causing interference to STA1 and to STA2. In a first option, STA1 and STA2 signal their transmit power level (TX-PWR_STA1 and TX-PWR_STA2) and their received signal strength indicator (RSSI) from the peer. Signaling TX-PWR allows a receiver (e.g., STA3) to determine the pathloss. For example, the pathloss between STA1 and STA3=TX-PWR_STA1−RSSI (by STA3 from STA1). Similarly, the pathloss between STA2 and STA3=TX-PWR_STA2−RSSI (by STA3 from STA2). Once pathloss is determined, STA3 can then determine its own TX power level (TPC) based on the following equations, and STA3 should select the lower TX power level between TPC1 and TPC2 such that STA3 would not cause interference to both STA1 and STA2.

Pathloss (STA1-3)=TX-PWR_STA1−RSSI (by STA3 from STA1);

Pathloss (STA2-3)=TX-PWR_STA2−RSSI (by STA3 from STA2); and

TPC1−pathloss(STA1-3)<RSSI (by STA1 from STA2)−Fixed Margin;

TPC2−pathloss(STA2-3)<RSSI (by STA2 from STA1)−Fixed Margin.

In an embodiment, only one of the two in-equality (TPC1 or TPC2) needs to be satisfied if the STA3 only observes transmission of one of STA1 or STA2.

Since STA3 power arrives at STA1/STA2 below its peer RSSI from STA2/STA1 minus fixed margin, it does not cause interference to STA1/STA2. The fixed margin, e.g., 20 dB, is required for signal to noise ratio (SNR) for operating certain MCS (Modulation and coding scheme). If STA3 cannot close the link with STA4, then STA3 should abandon its transmission. In some situations, STA3 does not receive either STA1 or STA2 signal. In this case, only one transmit power level (TPC1 or TPC2) obtained from the received signal is used.

In a spatial re-use environment, STA1 and STA2 might be operating at certain interference level from other links (which is above the noise level). In a second option, a more precise estimation of the TX power level for STA3 can be obtained if STA1 and STA2 directly signal their received interference level, or their adjusted CCA level. As a result, STA3 can then determine its TX power level based on the following equations for STA1 and STA2 respectively and select the lower TX power level between TPC1 and TPC2 such that STA3 would not cause interference to both STA1 and STA2.

TPC1−Pathloss (STA1-3)<received interference level_STA1−error margin;

TPC2−Pathloss (STA2-3)<received interference level_STA2−error margin; or

TPC1−Pathloss (STA1-3)<adjusted CCA level_STA1−error margin;

TPC2−Pathloss (STA2-3)<adjusted CCA level_STA2−error margin.

In an embodiment, only one of the two in-equality (TPC1 or TPC2) needs to be satisfied if the STA3 only observes transmission of one of STA1 or STA2.

Since STA3 power arrives at STA1/STA2 below its received interference level or its adjusted CCA level, it does not cause interference to STA1/STA2. The error margin, e.g., 5 dB, is applied to accommodate error. Note that the adjusted CCA level of STA3 is equal to the received interference (+noise) level at STA3. If STA3 cannot close the link with STA4, then STA3 should abandon its transmission. In some situations, the STA3 does not receive either STA1 or STA2 signal. In this case, only one transmit power level (TPC1 or TPC2) obtained from the received signal is used.

In addition to transmit power level (TX-PWR), RSSI from peer, received interference level, adjusted CCA level, additional information is required by STA3 from STA1 and STA2 for spatial re-use purpose. First, STA3 needs to identify whether the STA1/STA2 link is an inter-BSS link or an intra-BSS link. In order to do that, STA1 and STA2 should signal their BSS color, or TX IDs and RX IDs. A BSS color is a shortened indication (e.g., a 3-5 bits indication) of BSS ID, which is chosen by an AP based on its observation of BSS colors of overlapping neighbor BSSs. Second, STA3 needs to know the remaining TXOP duration of the ongoing STA1-STA2 frame exchange so that STA3 can gain a spatial re-use TXOP that is fair to other legacy STAs. Further details of the spatial re-use TXOP duration will be explained later with respect to FIG. 8.

The spatial re-use STAs calculate space loss to STA1 and STA2 and adjust their transmit power to be below the received interference-margin of STA1 and STA2 to avoid collision. In an IEEE 802.11ax only environment, such proposed TPC and adaptive CCA can avoid the collision during spatial re-use. However, in a mixed environment with both IEEE 802.11ax STAs and legacy STAs, spatial re-use STAs do not have the information to adjust their transmit power level. This is because legacy STAs do not signal their transmit power and received interference, CCA, or RSSI from peer. Therefore, a different TPC should be used in a mixed environment with legacy STAs.

Figure 5:
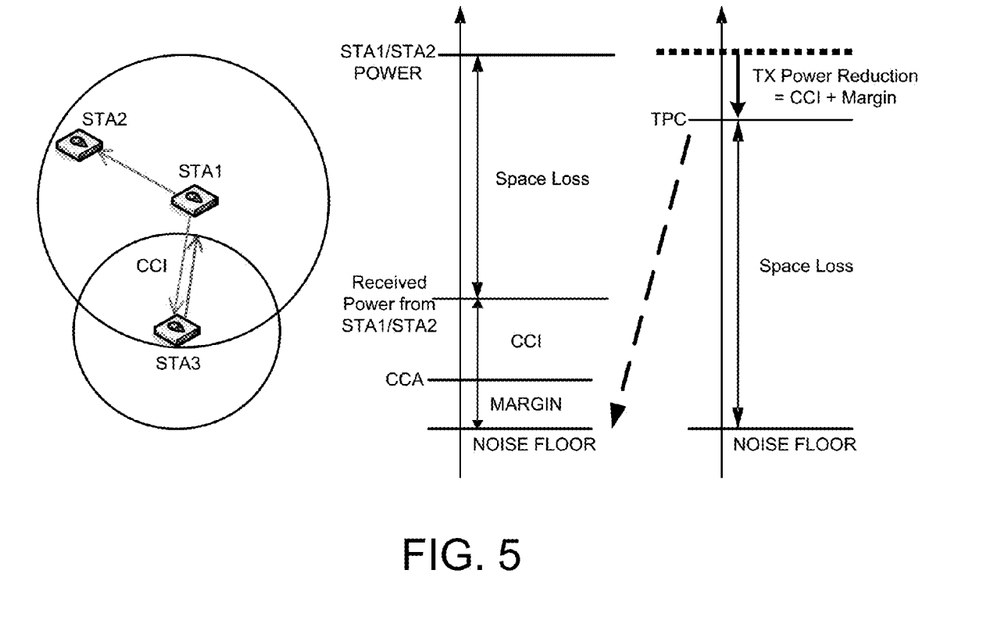
FIG. 5 illustrates another embodiment of transmit power control and adaptive CCA level based on RSSI for spatial re-use with legacy stations.

FIG. 5 illustrates another embodiment of transmit power control and adaptive CCA level based on RSSI for spatial re-use with legacy stations. In the example of FIG. 5, legacy STA1 and STA2 have ongoing frame exchange, and HEW STA3 applies TPC to ensure that any spatial re-use frame exchange will not causing interference to STA1 and to STA2. Because STA1 and STA2 in FIG. 5 are legacy STAs, they do not signal their TX-PWR, another TPC is proposed for STA3 that is based on the RSSI and signal bandwidth from STA1 and STA2. The basic assumptions here are 1) the received interference level is at the CCA of the legacy STA, and 2) the transmit power (i.e., TX-PWR_Ref) is the same for all STAs, with a margin to accommodate the TX power level differences. Alternatively, it is also reasonable to assume that all non-AP STAs have the same transmit power level and all AP STAs have the same transmit power level where AP's transmit power level and non-AP STA's transmit power level differ by a fixed value. As illustrated in FIG. 5, the co-channel interference (CCI) at STA3 is estimated to be CCI=MAX (Received PWR_STA1, Received PWR_STA2)−CCA, and the adjusted TPC=TX-PWR_Ref−CCI−margin.

Here, a reference transmit power level TX-PWR_Ref and the baseline CCA level at CCA_baseline are defined. Suppose that STA3, intending to access the medium, receives a signal from STA1 with a power level RX-PWR$_{STA1}$ exceeding CCA and/or receives a signal from STA2 with a power level RX-PWR$_{STA2}$ exceeding CCA. STA3 can raise its CCA level to max (RX-PWR$_{STA1}$, RX-PWR$_{STA2}$) (an increase of Δ=max(RX-PWR$_{STA1}$, RX-PWR$_{STA2}$)−CCA_baseline), and reduces its TX power level to TX-PWR_Ref−Δ−margin. STA3 is then allowed to access the medium in concurrent with STA1's transmission. If the adjusted transmit power is not enough to close the link, then STA3 abandons the transmission. Note that the margin is used to accommodate differences in transmit power from TX-PWR_Ref in STA1 and STA2, since STA1 and/or STA2 might not signal their transmit power. By reducing the transmit power below (TX-PWR_Ref−Δ−margin), the STA3 reduces the chance of causing interference to the transmitting STA (STA1) and achieves the spatial re-use.

Figure 6:
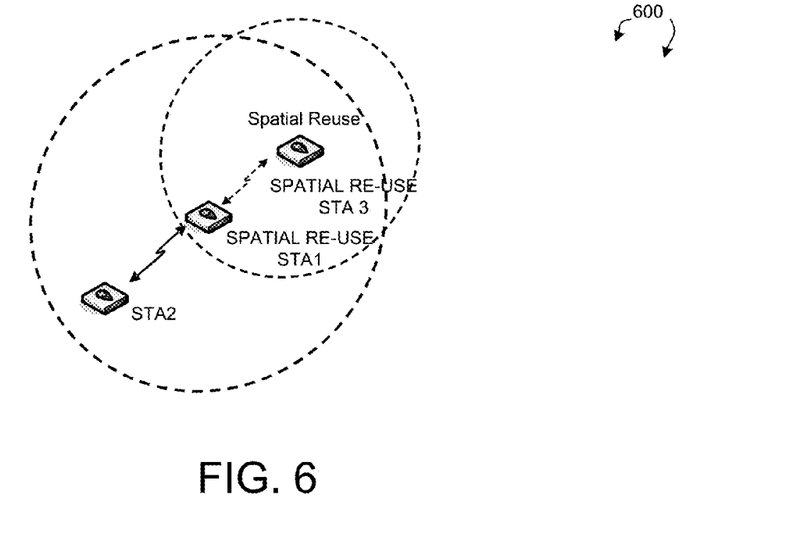
FIG. 6 illustrates one embodiment of spatial re-use with excessive margin.

FIG. 6 illustrates one embodiment of spatial re-use with excessive margin in a wireless network 600. In the example of FIG. 6, STA1 and STA2 have ongoing frame exchange, and STA3 is trying to initiate spatial re-use frame exchange with other STAs. Suppose STA1 has excess margin M_rx in the received link. The excess margin is defined as the difference between the received SNR and the required SNR when highest MCS is being used. STA1 can allow other OBSS spatial re-use STAs (e.g., STA3) more room for spatial re-use by: 1) signaling M_rx to other spatial re-use STAs, which allows OBSS STAs to have higher spatial re-use TPC; 2) lowering its own TPC to reduce interference to OBSS STAs, and 3) signaling an artificially raised received interference level or adjusted CCA to a higher level corresponding to M_rx, which allows OBSS STAs to have higher spatial re-use TPC.

In the above embodiments for transmit power adjustment, the spatial re-use STA4 in response to STA3 signal, should adjust its transmit power based on information received or received RSSI in the frame exchange signals of STA1 and STA2 immediately prior to STA3's transmission of spatial re-use signal.

Figure 7:
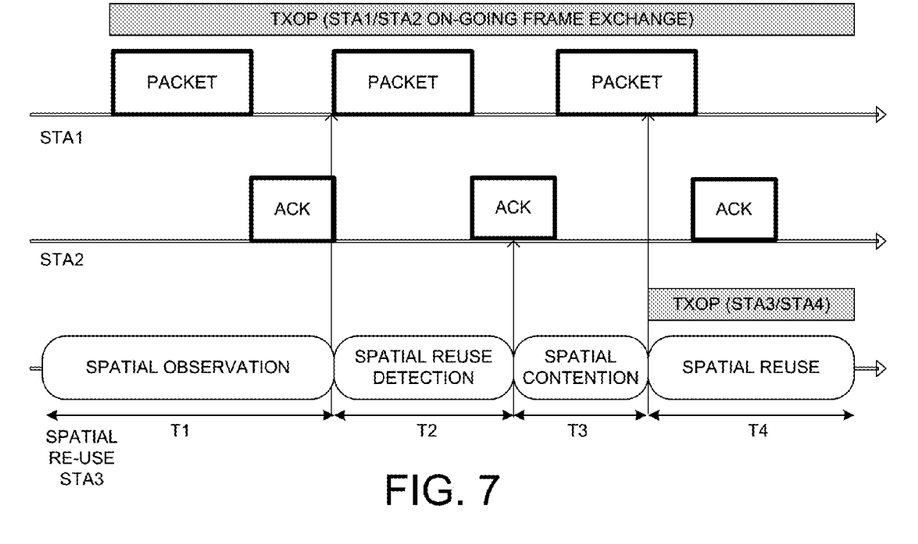
FIG. 7 illustrates a processing flow of spatial re-use in accordance with one novel aspect.

FIG. 7 illustrates a processing flow of spatial re-use in accordance with one novel aspect. In the embodiment of FIG. 7, spatial re-use STA3 performs a four-step spatial re-use procedure to be able to have spatial re-use frame exchange while OBSS STA1 and STA2 have ongoing frame exchange. The four steps are spatial observation, spatial re-use detection, spatial contention, and spatial re-use frame exchange.

In a first step of spatial observation, STA3 observes the medium and constantly updates its database prior to frame exchange. In one embodiment, STA maintains a long-term moving window for a medium activity database. For example, during T1=5 seconds, STA3 monitors medium activity, e.g., frame exchange between STA1 and STA2 and updates its database. The database information obtained from information signaled by STAs, observed RSSIs, BSS color, etc. The spatial observation allows STA3 to form a decision of what transmit power level to use during spatial re-use, and to determine whether the recipient STA is nearby or not when a nearby STA sends a frame. Note the TPC based on the long-term spatial observation is overly conservative since most of neighbor STAs observed might not be active during the spatial re-use frame exchange.

In a second step of spatial re-use detection, STA3 wants to initiate a frame exchange and therefore detects ongoing frame exchange in the medium to confirm that it is allowed to start a spatial re-use frame exchange. Since a pair of STAs (STA1 and STA2) are doing frame exchange, both STA1 and STA2 need to be taken into considerations during the spatial re-use detection. In order for STA3 not to interfere with both STA1 and STA2, STA3 observes the medium and performs spatial re-use detection. Spatial re-use detection mandates STA3 to observe the medium for a duration (e.g., T2) during which both STA1 and STA2 transmit PPDU. STA3 determines a first transmit power that would not cause interference to STA1, a second transmit power that would not cause interference to STA2, and then selects the lower transmit power so that the spatial re-use frame exchange would not interfere both STA1 and STA2. Note that STA3 might only receive signal from one of STA1 or STA2 during spatial detection. During spatial detection, STA3 should also collects spatial re-use information such as BSS color, received interference level or received RSSI or adjusted CCA, remaining TXOP duration from STA1 and STA2. A spatial re-use STA4 should also observes the medium and the spatial re-use information collected immediately prior to receiving a signal from STA3 is used to determine its transmit power level.

In a third step of spatial contention, STA3 contends the medium for spatial re-use with other STAs. After spatial re-use detection is completed, STA3 decides whether to initiate a spatial re-use frame exchange based on if it can close the link. STA3 shall perform a backoff procedure (e.g., EDCA procedure) during time T3 to prevent collision with other spatial re-use stations. STA3 spatial re-use backoff procedure should be independent from non-spatial-reuse backoff procedures that are not invoked by the adaptive CCA. This is to ensure fairness to legacy STAs, because legacy STAs do not participate in the spatial re-use EDCA. In other words, the spatial re-use EDCA cannot be used to change the back off counter of the EDCA that employs fixed legacy CCA levels. It is important that all spatial re-use STA use the same procedure to determine when to start spatial re-use backoff procedure to ensure all spatial re-use STAs compete equally and avoids collision among the spatial re-use STAs. At the completion of the EDCA backoff procedure, STA3 starts a spatial re-use frame exchange by transmitting a frame to its intended recipient station (e.g., STA4).

In a fourth step of spatial re-use frame exchange, STA3 gains spatial re-use TXOP and starts frame exchange with its peer station (e.g., STA4) during time T4. If STA4 is a legacy STA, STA3 shall start with a request to send (RTS) transmission to avoid STA4 interfering with STA1/STA2 or any other OBSS STAs in proximity to STA4. Legacy STA will not respond with clear to send (CTS) if its NAV is not zero. On the other hand, if STA4 is not a legacy STA, spatial re-use STA3 is not required to start with RTS. STA3 can send any type of frame, which does not observe NAV=0 rule. Spatial re-use STA4 adopts the CCA and TX power level adjustment rules for spatial re-use when it responds to STA3. STA4 should determine whether it could respond and adjust its TX power level based on the spatial re-use information it receives during spatial observation of ongoing medium activities prior to STA3's transmission, the prior or observed link margin with STA3. STA4 determines its TX power level the same way as STA3 based on its received or observed spatial re-use information.

Figure 8:
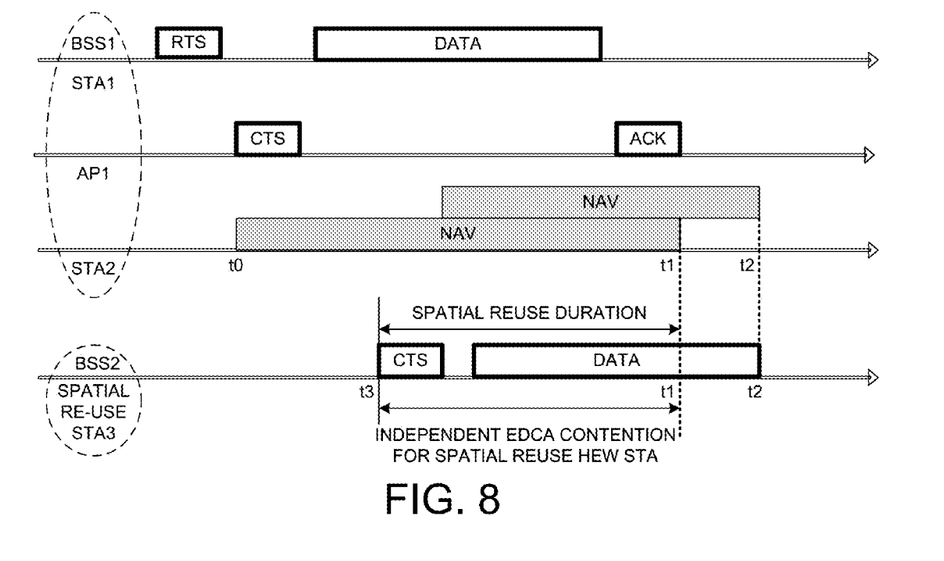
FIG. 8 illustrates spatial re-use and corresponding frame exchange with fair TXOP duration and EDCA rules.

FIG. 8 illustrates spatial re-use and corresponding frame exchange with a fair TXOP duration and EDCA rules in a mixed wireless network with both legacy stations and spatial re-use stations. In the example of FIG. 8, AP1, STA1 and STA2 belong to a first BSS1, while spatial re-use STA3 belongs to a second BSS2. STA1 and AP1 engages in an ongoing frame exchange. Spatial re-use STA3 initiates a spatial re-use frame exchange with other stations in BSS2 (e.g., another STA, STA4, not shown). Suppose STA2 is a legacy station, and its NAV setting is non-zero from time t0 to t1 due to the ongoing frame exchange between STA1 and AP1. However, when spatial re-use STA3 establishes spatial re-use duration from t3 to t2, STA2 has to reset its NAV from t1 to t2. This results in an unfair advantage of spatial re-use STA3 over legacy STA2 since it causes STA2 to be deferred further.

In order to resolve the unfair situation to legacy STA2, the spatial re-use frame exchange duration (TXOP) should be limited to the original NAV setting between STA1 and AP1. The spatial re-use transmission shall end before time t1 so that it will not cause STA2 NAV to be extended to time t2. As a result, STA2 can resume medium contention from time t1. In one embodiment, STA1 and AP1 can signal the remaining TXOP duration. For example, they signal the remaining duration from a reference time epoch in the packet such as at the end of the preamble or end of the packet transmission. When STA3 performs spatial contention so that STA3 contends the medium and gains a fair spatial re-use duration with TXOP that ends at time t1.

Because spatial re-use medium access involves only spatial re-use stations but not legacy stations, a separate and independent EDCA contention would be required for stations participate in spatial re-use medium access. As illustrated in FIG. 8, the original EDCA is suspended upon receiving RTS or CTS, and resumes after t1. The following description provides an example of a fair spatial re-use EDCA backoff procedure.

When a protection NAV for a TXOP is set up for an on-going frame exchange and spatial detection is performed by an OBSS non-AP spatial re-use STA or OBSS spatial re-use AP, the OBSS non-AP spatial re-use STA or OBSS spatial re-use AP may initiate a spatial re-use exchange after a spatial re-use Backoff. For a non-AP spatial re-use STA, the spatial re-use Backoff is initialized with pre-defined EDCA parameters or from the most recently received spatial re-use EDCA parameter set element sent by the AP with which the STA is associated. For a spatial re-use STA, the spatial re-use Backoff is initialized with the spatial re-use EDCA parameters. The spatial re-use Backoff function begins or resumes when the spatial detection is performed. The spatial re-use Backoff function is independent of all other legacy backoff functions but follows the similar EDCAF backoff procedure. An OBSS non-AP spatial re-use STA or OBSS spatial re-use AP that invokes or resumes a spatial re-use Backoff at the confirmation of a spatial re-use condition shall set a spatial re-use timer to NAV or based on spatial re-use information such as received remaining TXOP duration and reset its NAV and suspend EDCAF backoff procedures. At the expiry of the spatial re-use timer, the spatial re-use Backoff is suspended and the suspended EDCAF backoff procedures resume. An OBSS non-AP spatial re-use STA or OBSS spatial re-use AP that initiates a new spatially re-use frame exchange after a spatial re-use Backoff procedure shall start the exchange with RTS/CTS when transmitting to a legacy STA or start with regular frame when transmitting to another spatial re-use STA and shall limit the duration of the exchange such that it ends before the expiry of the spatial re-use timer. The STA shall obey the TXOP limit of the AC of the frames transmitted within the spatial re-use frame exchange or the remaining TXOP duration received during spatial detection. An STA that transmits a spatial re-use frame exchange may transmit additional spatial re-use frame exchanges by continuing to use the spatial re-use Backoff function until the expiry of the spatial re-use timer. If the ongoing frame exchange transmission is between a pair of STAs within its BSS (with matching BSS color), the STA does not reset its NAV even though the Spatially Re-use conditions are met.

Figure 9:
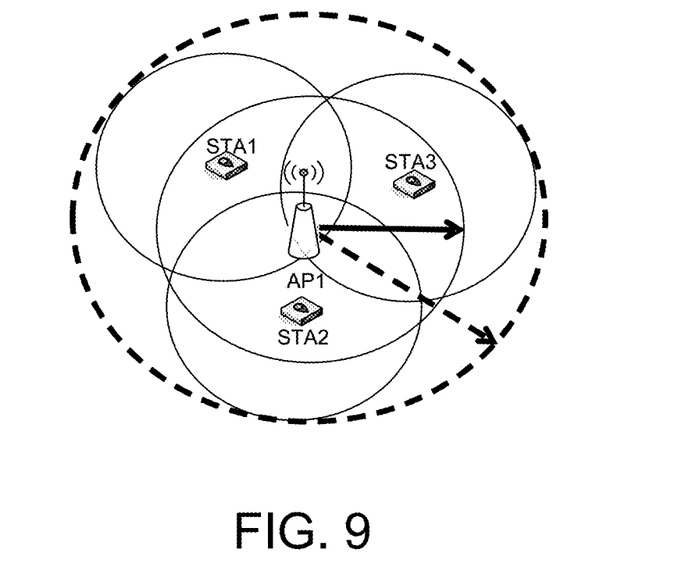
FIG. 9 illustrates an example of spatial re-use with uplink (UL) OFDMA.

FIG. 9 illustrates an example of OFDMA operation. One mode of Uplink (UL) OFDMA operation starts with AP1 transmitting a trigger frame and multiple STAs (STA1-STA3) transmit UL OFDMA signals which occupy a fraction of the channel bandwidth. Because STAs, in response to AP signal, might not perform CCA before their uplink transmission and STAs have high transmit power density (narrow band signal), it is expected that STAs' signals may propagate farther than APs signal. Additionally, STAs' transmission duration can be shorter than TXOP. Therefore, it is more difficult to perform spatial observation or spatial re-use detection for UL OFDMA. In one preferred embodiment, an OBSS spatial re-use STA can use the aggregate received power and aggregate received interference from these OFDMA STAs to adapt its CCA level and determine its transmit power adjustment. In another embodiment, an OBSS spatial re-use STA can use the max-received power from all the OFDMA STAs to adapt its CCA and adjust its TX power to be below minimum received interference of all OFDMA STAs. In another option, no spatial re-use is applied if UL OFDMA is used. In another option, AP-to-AP coordination is required for UL OFDMA to mitigate OBSS interference based on some pre-determined procedure.

Figure 10:
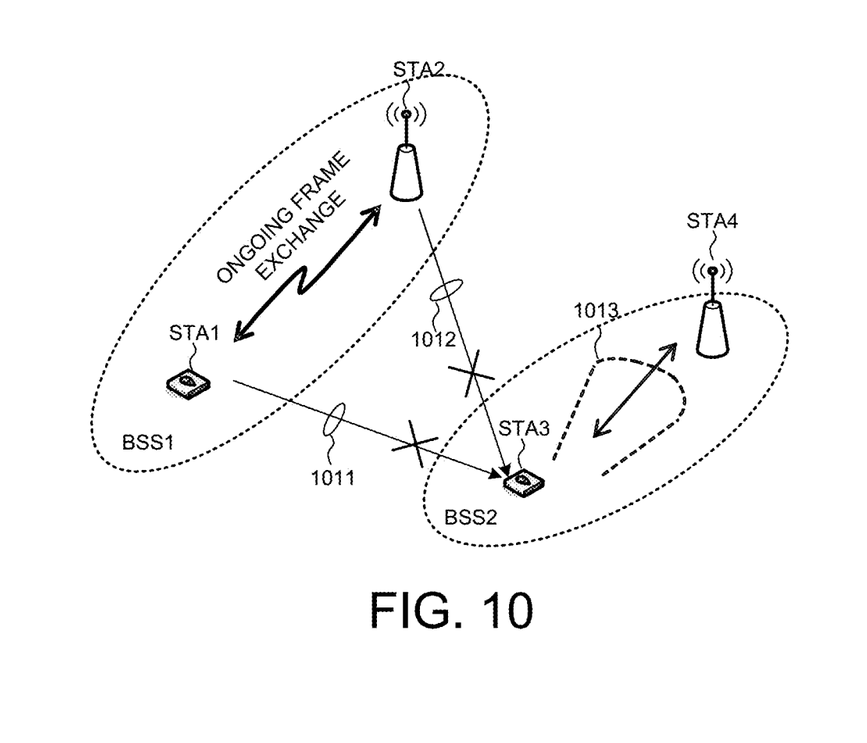
FIG. 10 illustrates an example of spatial re-use with beamformed transmission.

FIG. 10 illustrates an example of spatial re-use with beamformed transmission. For an STA with spatial reciprocity, it can employ beamforming during spatial re-use detection. Spatial reciprocity is a device capability of transmitting and receiving with the same antenna pattern that could be synthesized with multiple antennas. In the example of FIG. 10, STA1 and STA2 engages in an ongoing frame exchange in BSS1. Spatial re-use STA3 can perform spatial detection under beamformed condition. Note that proper beamforming antenna setting 1013 can be used to suppress the received power from STA1 and/or STA2 or to enhance link margin with STA4 during spatial detection and spatial re-use frame exchange. After STA3 performs the spatial detection, spatial re-use STA3 initiates a spatial re-use frame exchange with STA4 in BSS2. STA3 performs a spatial detection with radio signals 1011 and 1012 from STA1 and STA2 via spatially reciprocal beamforming. If STA3 cannot hear from STA1 and STA2 using a beamformed antenna pattern 1013 for receiving, then the radio signals transmitted from the spatially reciprocal device STA3 do not interfere STA1 and STA2 if STA3 applies with the same beamformed antenna pattern 1013. Note that the same adaptive CCA and transmit power adjustment procedure can be applied to the spatially reciprocal beamforming STAs for spatial re-use. Proper beamforming in conjunction with the proposed TPC and adaptive CCA can enhance the spatial re-use by suppressing STA1 and/or STA2 signal level and/or enhancing link robustness and quality between STA3 and STA4.

Figure 11:
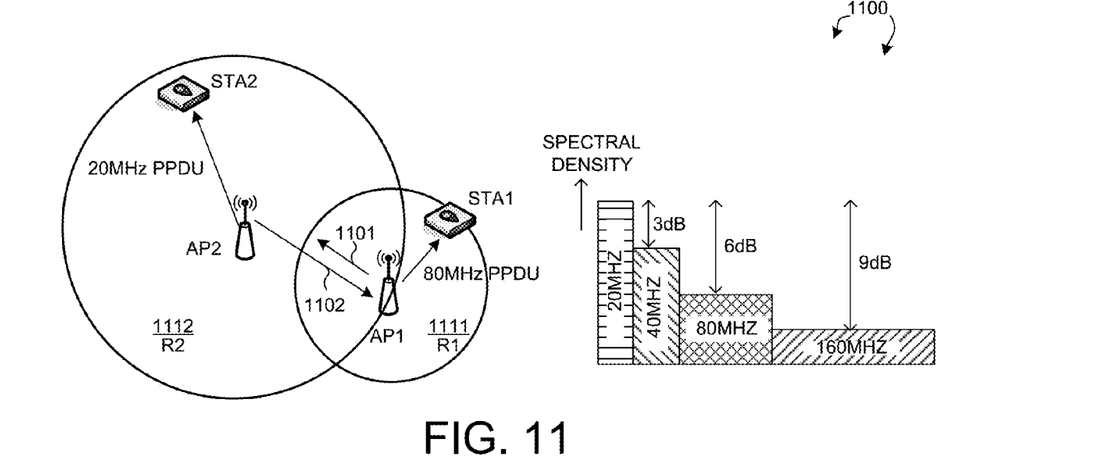
FIG. 11 illustrates an example of spatial re-use with different channel width.

FIG. 11 illustrates an example of spatial re-use with different channel widths. The signal propagation range is determined by the spectral density (power/Hz) instead of the signal power level. Currently, the baseline (primary channel) CCA levels are based on equal spectral density for all RX channel widths. For example, the CCA level/channel width (in unit of 20 MHz) is equal to −82 dBm, −79 dBm, −76 dBm, −73 dBm for any 20 MHz, 40 MHz, 80 MHz, and 160 MHz RX channels, respectively. However, the TX spectral density is not the same for all TX channel widths. The TX spectral density of a narrower TX channel is typically higher than the TX spectral density of a wider TX channel, e.g., TX_PWR/20M>TX_PWR/40M>TX_PWR/80M>TX_PWR/160M. As a result, a narrower TX channel width transmission interferes or defers a wider channel width transmission. The likelihood of the wider channel transmission is therefore reduced based on the current EDCA procedure.

To accommodate the different channel widths, the parameter TX-PWR used in the spatial re-use protocol should be adjusted for different TX channel width. TX-PWR should be scaled to provide equal TX spectral density. As illustrated in FIG. 11, TX-PWR_160M=TX-PWR_80M+3 dB=TX-PWR_40M+6 dB=TX-PWR_20M+9 dB. This means that wider TX channel width is allowed to transmit at higher power than narrower TX channel width. Note that these transmit power level is determined based on the received power density level (received RSSI scaled by signal bandwidth from legacy STAs) or the received interference power density level or adjusted CCA level scaled by the signal bandwidth received from spatial re-use STA. Additionally, the signaled TX power level should be adjusted by bandwidth. This resolves the issue of narrower width transmission interfering or deferring a wider width transmission. The likelihood of the wider channel transmission is increased.

Accordingly, it is desirable to modify the EDCA channel access rules to achieve equal TX spectral density for all channel widths. In one example, an STA follow the following modified EDCA channel access: a) Transmit a 160 MHz or 80+80 MHz mask PPDU at the power level P if the secondary channel, the secondary 40 MHz channel and the secondary 80 MHz channel were idle during an interval of PIFS immediately preceding the start of the TXOP; b) Transmit an 80 MHz mask PPDU at the power level P-3 dB on the primary 80 MHz channel if the secondary channel and the secondary 40 MHz channel were idle during an interval of PIFS immediately preceding the start of the TXOP; c) Transmit a 40 MHz mask PPDU at a power level P-6 dB on the primary 40 MHz channel if the secondary channel was idle during an interval of PIFS immediately preceding the start of the TXOP; d) Transmit a 20 MHz mask PPDU at a power level P-9 dB on the primary 20 MHz channel; and e) Restart the channel access attempt by invoking the backoff procedure as though the medium is busy on the primary channel as indicated by either physical or virtual CS and the backoff timer has value of 0.

Figure 12:
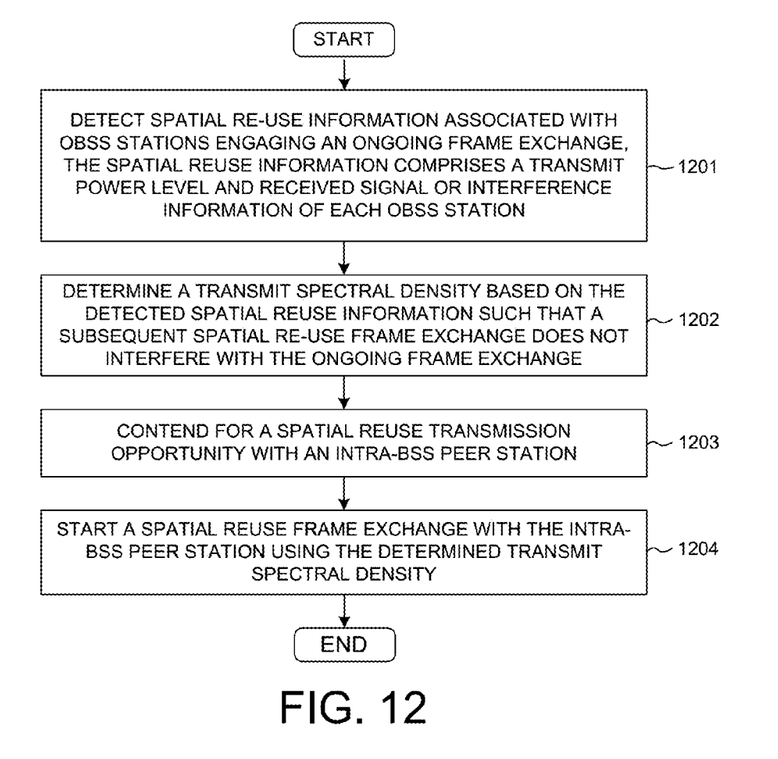
FIG. 12 is a flow chart of a method of spatial re-use with TPC and adaptive CCA in accordance with one novel aspect.

FIG. 12 is a flow chart of a method of spatial re-use with TPC and adaptive CCA in accordance with one novel aspect. In step 1201, a spatial re-use station detects spatial re-use information associated with other peer stations belong to an inter-BSS or overlapping BSS. The inter-BSS peer stations engage an ongoing frame exchange. The spatial re-use information comprises a TX spectral density (power/Hz) and received signal or interference information of each inter-BSS peer station. In step 1202, the spatial re-use STA determines a TX spectral density based on the detected spatial re-use information. In step 1203, the spatial re-use STA contends the medium for spatial re-use transmission opportunity (TXOP) with an intra-BSS peer station. In step 1204, the spatial re-use STA starts a spatial re-use frame exchange with the intra-BSS peer station using the determined TX spectral density such that the spatial re-use frame exchange does not interfere with the ongoing frame exchange. By adjusting the TX spectral density, the spatial re-use STA adapts its CCA level to spatially reuse the medium without causing collision and interference to OBSS stations and thus increases network throughput.

Referring back to FIGS. 4 and 5, a reference transmit power level TX-PWR_Ref and the baseline CCA level at CCA_baseline are defined. Suppose that STA3, intending to access the medium, receives a signal from STA1 with a power level RX-PWR$_{STA1}$ exceeding CCA and/or receives a signal from STA2 with a power level RX-PWR$_{STA2}$ exceeding CCA. STA3 can raise its CCA level to max(RX-PWR$_{STA1}$, RX-PWR$_{STA2}$) (an increase of Δ=max(RX-PWR$_{STA1}$, RX-PWR$_{STA2}$)−CCA_baseline), and reduces its TX power level to TX-PWR_Ref−Δ−margin. STA3 is then allowed to access the medium in concurrent with STA1's transmission. The above description is a general case of two stations (STA1 and STA2). In a simplified scenario by observing only STA', the spatial reuse STA3 can raise its CCA level to RX-PWR$_{STA1}$ (an increase of Δ=RX-PWR$_{STA1}$, −CCA_baseline), and reduces its TX power level to TX-PWR_Ref−Δ (where "margin" can be absorbed into TX-PWR_Ref).

Figure 13:
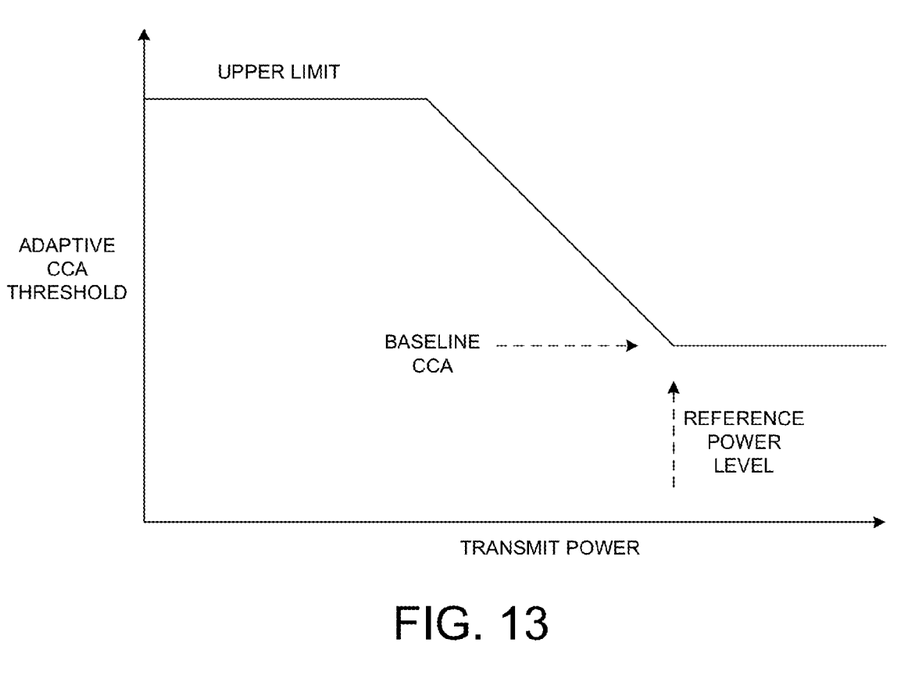
FIG. 13 illustrates an adaptive CCA threshold of a spatial reuse STA based on baseline CCA level and a reference transmit power level.

FIG. 13 illustrates an adaptive CCA threshold of a spatial reuse STA based on baseline CCA level (Baseline CCA) and a reference transmit power level (Ref_PWR$_{Level}$). The spatial reuse STA reduces its transmitting power TX$_{PWR}$ by Δ, and raises its adaptive CCA threshold CCA$_{Threshold}$ by Δ, while Δ=Ref_PWR$_{Level}$−TX$_{PWR}$. In one specific example, the baseline CCA level is −72 dBm (20 MHz), and the reference transmit power level is 23 dBm. The above description can be expressed as:

$$CCA_{Threshold} = \max\left\{\begin{array}{l} \text{Baseline } CCA \\ \min\left\{\begin{array}{l}\text{Upper Limit} \\ \text{Baseline } CCA + \left(Ref_{PWR_{Level}} - TX_{PWR}\right)\end{array}\right\} \end{array}\right\}$$

Spatial re-use by STA3 may cause interference to the ongoing frame exchange between STA1 and STA2. During spatial re-use contention, if STA3 observes the medium energy level increases (due to another STA initiating a spatial re-use transmission), STA3 should abandon the spatial re-use attempt. This limit the number of spatial re-use transmission, which can significantly increase interference to STA1 and STA2. In one embodiment, the responding station sends a response to inhibit the spatial re-use attempt by STA3. The response comprises a flag in a header indicating that spatial re-use is disallowed and thus inhibiting the spatial re-use attempt by the initiating station STA3. In an alternative embodiment, an initiating station may also set the spatial re-use inhibit flag in a frame header to prevent too many stations from transmitting spatial re-use.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method performed by an initiating wireless station, the method comprising:
    detecting spatial re-use information associated with one or more detected overlapping basic service set (OBSS) stations engaging an ongoing frame exchange;
    determining a transmit (TX) power or power density level and an adjusted clear channel assessment (CCA) level based on the detected spatial re-use information; and
    attempting to initiate a spatial re-use frame exchange with a responding wireless station in concurrent with the ongoing frame exchange of the detected OBSS stations.

2. The method of claim 1, wherein the adjusted CCA level is raised to be equal to or above a detected power from each of the one or more detected OBSS stations.

3. The method of claim 1, wherein the detected spatial re-use information comprises a transmit power or power density level signaled by each of the one or more detected OBSS stations for determining a corresponding space loss.

4. The method of claim 1, wherein the detected spatial re-use information comprises a received interference power or power spectral density level signaled by the one or more detected OBSS stations.

5. The method of claim 4, wherein the determined TX power or power density level results a spatial re-use signal arriving at the one or more OBSS stations is below the signaled interference power or power spectral density level of the OBSS stations by a predefined margin.

6. The method of claim 1, wherein the detected spatial re-use information comprises an adjusted clear channel assessment (CCA) level signaled by the one or more detected OBSS stations.

7. The method of claim 6, wherein the determined TX power or power density level results a spatial re-use signal arriving at the one or more OBSS stations is below the signaled adjusted CCA level of the OBSS stations by a predefined margin.

8. The method of claim 1, wherein the detected spatial re-use information comprises a peer received signal strength indicator (RSSI) signaled by the one or more detected OBSS stations.

9. The method of claim 8, wherein the determined TX power or power density level results a spatial re-use signal arriving at the one or more OBSS stations is below the signaled peer received RSSI of the OBSS stations by a predefined margin.

10. The method of claim 1, wherein the detected spatial re-use information comprises a signal bandwidth signaled by the one or more detected OBSS stations, and wherein the detected spatial re-use information is scaled by the signal bandwidth.

11. The method of claim 1, further comprising:
signaling spatial re-use information of the initiating wireless station, the information comprising at least one of a transmit power level, a transmit power density level, a signal bandwidth, a BSS color, a TX/RX ID, a received peer RSSI, a received interference power level, a received interference power spectral density level, an adjusted CCA level, and an excess margin.

12. The method of claim 1, wherein the detected spatial re-use information comprises an excess margin signaled by the one or more detected OBSS stations, and wherein the excess margin is defined as a difference between a link signal to noise ratio (SNR) and a required SNR for the highest modulation and coding scheme (MCS).

13. The method of claim 1, wherein the OBSS stations are legacy stations, and wherein the spatial re-use information is detected based on the received signal power or power spectral density level, a reference transmit power level and an estimated co-channel interference of the legacy stations.

14. The method of claim 1, wherein the OBSS stations applies OFDMA for uplink transmission, and wherein the determined TX power level or power density level is based on an aggregated received interference power level or power spectral density level of the OBSS stations.

15. The method of claim 1, wherein the OBSS stations applies OFDMA for uplink transmission, and wherein the determined TX power level or power density level is based on a maximum received power level or power density level from the OBSS stations.

16. The method of claim 1, wherein the determined TX power decreases by an amount from a reference transmit power level, wherein the adjusted CCA level increases by the same amount, and wherein the adjusted CCA level is between a lower limit and an upper limit.

17. A method performed by a responding wireless station, the method comprising:
detecting spatial re-use information associated with one or more detected overlapping basic service set (OBSS) stations engaging an ongoing frame exchange;
determining a transmit power or power density level based on the detected spatial re-use information; and
engaging in a spatial re-use frame exchange with an initiating wireless station in concurrent with the ongoing frame exchange of the detected OBSS stations.

18. The method of claim 17, wherein the detected spatial re-use information comprising at least one of a transmit power level, a transmit power density level, a signal bandwidth, a BSS color, a TX/RX ID, a received peer RSSI, a received interference power level, a received interference power spectral density level, an adjusted clear channel assessment (CCA) level, and an excess margin.

19. The method of claim 17, wherein the determined TX power or power density level results a spatial re-use signal arriving at the one or more OBSS stations is below the detected interference power or power spectral density level, the detected adjusted CCA level, or the detected peer received RSSI by a predefined margin.

20. The method of claim 17, wherein the responding wireless station sends a response to inhibit the spatial re-use attempt.

21. The method of claim 17, wherein the response comprises a spatial re-use flag in a header of the response.

22. A method performed by an initiating wireless station, comprising:
(a) detecting spatial re-use information associated with overlapping basic service set (OBSS) stations, wherein the spatial re-use information comprises a transmit power level and received signal or interference information of each OBSS station;
(b) determining a transmit power level or power density level and an adjusted clear channel assessment (CCA) level based on the detected spatial re-use information;
(c) contending for a spatial re-use transmission opportunity (TXOP) with a spatial re-use responding station; and
(d) starting spatial re-use frame exchange with the spatial re-use responding station using the transmit power level or power density level determined in (b).

23. The method of claim 22, further comprising:
observing a wireless medium for spatial re-use during a moving window before the detecting in (a), wherein the station updates a database storing the spatial re-use information.

24. The method of claim 22, wherein the spatial re-use information further comprises a BSS color that indicates a BSS ID of the OBSS.

25. The method of claim 22, wherein the spatial re-use information further comprises a remaining TXOP duration, and wherein the spatial re-use TXOP is set to be less than or equal to the remaining TXOP.

26. The method of claim 22, wherein the contending in (c) involves an independent backoff procedure for the spatial re-use TXOP.

27. The method of claim 22, wherein the initiating wireless station sets a spatial re-use inhibit flag in a frame header to inhibit spatial re-use attempts.

* * * * *